April 22, 1941.  K. SANDER  2,239,252
PIPE COUPLING
Filed Oct. 7, 1938
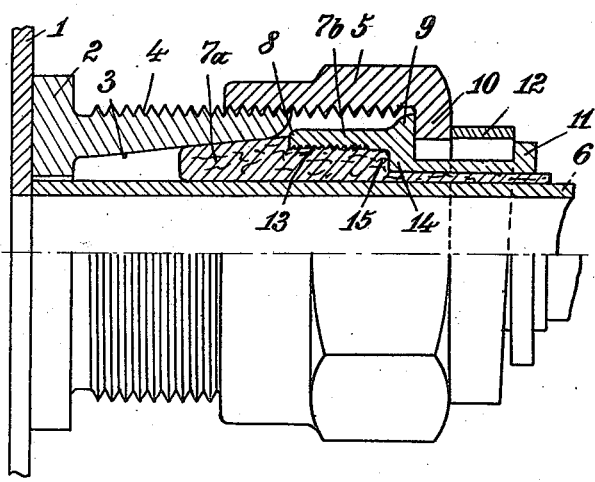
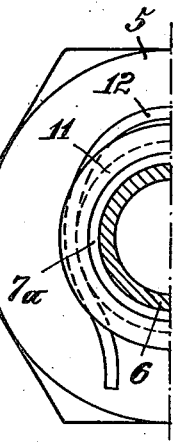
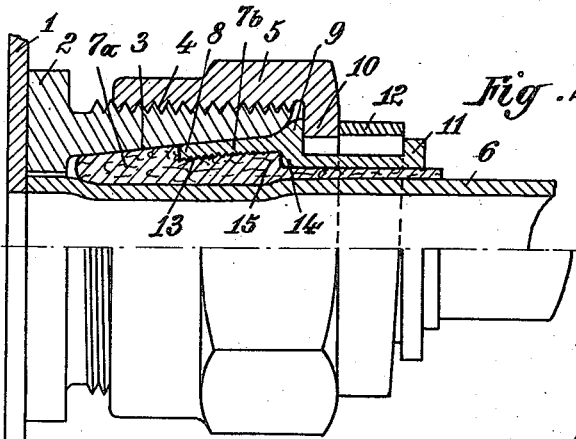
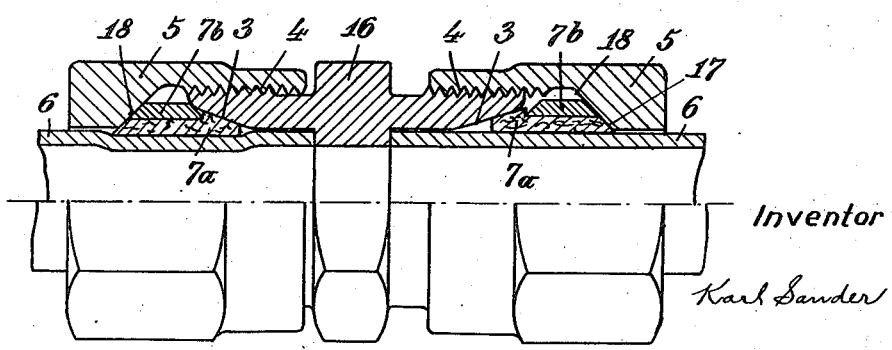
Inventor
Karl Sander
By Sommers, Young
Attorneys Patented Apr. 22, 1941

2,239,252

UNITED STATES PATENT OFFICE 2,239,252

PIPE COUPLING

Karl Sander, Osnabruck, Germany

Application October 7, 1938, Serial No. 233,849
In Germany October 4, 1937

2 Claims. (Cl. 285—166)

This invention relates to a pipe coupling by which a pipe can be connected either to another pipe or to a connection member or nipple. The coupling is particularly suitable for thin-walled pipes since the thickness of the wall of the pipe is in no way reduced when the new coupling is used.

The kind of coupling to which the invention relates is that which comprises a coupling member having a conical mouth into which the end of the pipe is inserted, a second coupling member or nut which is adapted to be coupled to the first and a conical packing ring which is clamped with its inner surface against the pipe and its conical surface against the correspondingly conical mouth of the one coupling member, when the two coupling members are coupled together.

It is known to make the packing rings for couplings of this kind of yielding material, but the known rings were not satisfactory as they were liable to crack or split particularly if the coupling members were tightly coupled together, or to swell if moisture penetrates from the outside.

An object of the invention is to provide an improved packing ring which ensures a tight joint being made.

According to the invention, the packing ring is made of two parts, namely a relatively thin front part of yielding material, for example fibre, and a thicker rear part of a metal which is hard relatively to the front part. This packing ring is then inserted in the conical mouth of the one coupling member with its thinner end foremost, so that the conical surface which is made of yielding material bears against the correspondingly conical surface of the mouth of the coupling member. The two parts are so dimensioned that, when the coupling is tightened, the thicker hard rear part of the packing ring also bears against the conical surface mouth of the coupling member, so that when the coupling is tightened the softer part of the packing ring is enclosed between hard parts and can only expand slightly towards the front. The result is that not only is an exceedingly tight joint formed at the conical surface, but that swelling and cracking of the yielding packing member is entirely avoided, also the coupling members can be tightened up to such an extent that the yielding part of the ring is pressed into the pipe and an absolutely reliable joint is thereby ensured.

Preferably, the rear part of the packing ring which is made of hard metal, is so dimensioned that its front edge which is preferably rounded projects slightly beyond the conical surface of the front part, so that when the coupling members are tightened it is pressed inwardly. By this means that portion of the yielding part of the packing ring which is enclosed by the harder part is also pressed inwardly against the pipe so that the pipe is slightly constricted.

In the case of couplings which are subject to particularly heavy vibration it is advisable to provide at the end of the rear hard part of the packing ring a collar which, when the coupling is tightened, projects so far out of the second coupling member or nut that a safety clamp can be fixed between the nut and this collar. This collar has the further advantage that, when the coupling has to be disconnected, a tool can be applied to it for the purpose of withdrawing the packing ring from the conical mouth of the coupling member.

If there is any danger of corrosion it is advisable to extend the yielding part of the packing ring, which is made for example of fibre and is therefore suitable for insulating the metal, so far to the rear that it completely separates the metallic part of the packing ring from the pipe.

If unusually strong vibrations are not to be expected, the angle of the conical surface of the packing ring can be steeper, the yielding part of the ring can be relatively short, and the harder metallic part may be in the form of a thin ring, for example of steel, which is inserted over the yielding part. This ring may be bevelled at the rear end and the second coupling member or nut provided with a correspondingly conical bearing surface. When the coupling is tightened, the front edge of this ring, which is also bevelled or conical, bears against the conical mouth of the one coupling member after the yielding part has been firmly wedged in position, while the nut presses directly against the rear conical end. Under the pressure which is thereby exerted the ring is compressed so that the yielding part constricts the pipe slightly. It may also be advisable to fit the nut so closely on to the pipe that its conical bearing surface presses from the rear also against the yielding part of the packing ring. This form of connection has the particular advantage that the diameter of the two coupling members may be kept small.

Two forms of a pipe coupling in accordance with the invention are illustrated by way of example in the accompanying drawing, in which—

Figure 1 is a longitudinal section showing the coupling of a pipe to a nipple before the coupling members are tightened;

Figure 2 shows the coupling in the tightened condition and

Figure 3 is a part end elevation seen from the right-hand side of Fig. 1;

Figure 4 shows the coupling of two pipes, the right-hand side showing the parts before tightening the coupling member and the left-hand side showing the parts in the tightened condition.

Referring to the drawing in the form of construction illustrated in Figure 1, there is fixed to the wall 1 a nipple 2 which is provided on the inside with a conical surface 3 and on the outside with a screw thread 4. A coupling nut 5 can be screwed on the thread 4. Between the pipe 6 and the conical surface 3 of the nipple is inserted a packing ring, which consists of a front part 7a which is made of yielding material, for example fibre, and a rear part 7b, which is made of steel or brass for example. The rear part 7b has an annular projection 9 against which the collar 10 of the coupling nut 5 bears. The front edge 8 of the part 7b is rounded in order to reduce the friction at the conical surface 3. This edge projects, as Figure 1 shows, slightly beyond the conical surface of the part 7a so that, when the coupling members are tightened, it presses the yielding part 7a firmly against the pipe. Recesses or protuberances, for example a thread 13, can be provided on the inside of the metallic part 7b in order to improve the adherence between the two parts of the packing ring.

The part 7b is extended rearwardly and carries at its end a collar 11. A fork-like wedge-shaped clamp 12 can be inserted between this collar 11 and the coupling nut, so as to prevent the coupling from becoming loose. When the coupling is to be disconnected, the collar 11 can be used for withdrawing the packing ring and the clamped end of the pipe from the nipple by introducing a tool between the nut and the collar.

The rear part of the packing ring is provided with a shoulder 14 and the front part is provided with a corresponding shoulder 15. For avoiding corrosion, the part 7a is also extended to the rear so that it separates the part 7b from the pipe. If there is no danger of corrosion this extension can be omitted and the part 7b may be in contact with the pipe.

In the form of construction according to Figure 4 there is an intermediate piece 16 which is provided with two conical surfaces 3, to each of which a pipe can be connected. Coupling nuts 5 can be screwed on the external threads 4. A steel ring 7b is inserted over the packing ring 7a which is made, for example, of fibre. Both the parts 7a and 7b are bevelled conically at their rear ends to form a surface 17 against which the correspondingly conical surface 18 of the coupling nut 5 bears. Owing to the joint action of the conical surfaces 3 and 18 the ring 7b is compressed when the coupling members are tightened and the yielding part 7a which is simultaneously pressed against the conical surface 3 is pressed against the pipe 6 and slightly constricts it.

What I claim is:

1. A pipe coupling of the kind set forth comprising cooperative coupling members, and nested front and rear packing parts; the front packing part being composed of yielding fibrous material; the rear packing part forming an extension of the front part and being composed of a metal which is relatively harder than the front packing part but is capable of being deformed; said front and rear packing parts having interengaging shoulders; the outer surface of the front packing part, forwardly of the rear part, being tapered forwardly so as to be smaller at its forward end; one of said coupling members having a socket which is tapered forwardly and the inner end of which is smaller than the forward end of the front packing part and the rear end of which is larger than the forward end of said front packing part, said socket being longer than the part of the fibrous front packing part forward of the rear packing part, and being slightly larger than the forward end of the rear packing part; means on the second coupling member for engaging with the rear packing part for pressing the packing parts into the socket of the first coupling member so that the forwardly tapering portion of the front packing part engages the inner wall of the forwardly tapered socket and is pressed inwardly in sealing relation with the pipe; and the front end portion of the rear packing part, by engagement with the socket of the first coupling member, is considerably reduced in diameter and strongly presses the fibrous front packing part on the pipe in sealing relation.

2. A pipe coupling of the kind set forth comprising cooperative coupling members, and nested front and rear packing parts; the front packing part being composed of yielding fibrous material; the rear packing part forming an extension of the front part and being composed of a metal which is relatively harder than the front packing part but is capable of being deformed; said front and rear packing parts having interengaging shoulders; the outer surface of the front packing part, forwardly of the rear part, being slightly conical and smaller forwardly; one of said coupling members having a correspondingly slightly conical socket, the front end of which is smaller than the front end of the front packing part and the rear end larger than the front end of said fibrous front packing part; said socket being longer than the portion of front packing part forward of the rear packing part, the rear end of the conical socket being slightly smaller than the front portion of the rear packing part but being rounded off to larger diameter than said front portion of the rear part; means on the second coupling member for engaging with the rear packing part for pressing the packing parts into the socket of the first coupling member so that the conical portion of the front packing part engages the inner wall of the forwardly tapered socket and is pressed inwardly in sealing relation with the pipe and the front end of the rear packing part, by engagement with the conical socket of the first coupling, is considerably reduced in diameter and strongly presses the portion of the fibrous front part located inwardly thereof against the pipe in sealing relation; the fibrous front packing part having a tubular rearward extension located between the rear packing part and the pipe to maintain the metal rear packing part out of engagement with the pipe to reduce corrosion.

KARL SANDER.